(12) United States Patent
Birnbaum et al.

(10) Patent No.: US 9,133,829 B2
(45) Date of Patent: Sep. 15, 2015

(54) SOLAR THERMAL POWER PLANT HAVING A BYPASS CONDUCTION PATH BYPASSING THE SUPERHEATING AND/OR STEAM GENERATION STAGES OF THE SOLAR CIRCUIT AND USING INDIRECT EVAPORATION AND METHOD FOR OPERATING SUCH A SOLAR THERMAL POWER PLANT

(75) Inventors: Jürgen Birnbaum, Nürnberg (DE); Markus Fichtner, Wolframs-Eschenbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 32 days.

(21) Appl. No.: 13/637,654

(22) PCT Filed: Feb. 15, 2011

(86) PCT No.: PCT/EP2011/052164
§ 371 (c)(1),
(2), (4) Date: Sep. 27, 2012

(87) PCT Pub. No.: WO2011/124408
PCT Pub. Date: Oct. 13, 2011

(65) Prior Publication Data
US 2013/0019599 A1 Jan. 24, 2013

(30) Foreign Application Priority Data
Mar. 30, 2010 (DE) .......................... 10 2010 013 363

(51) Int. Cl.
*F03G 6/00* (2006.01)
*F03G 6/06* (2006.01)

(52) U.S. Cl.
CPC .......... *F03G 6/067* (2013.01); *Y02E 10/46* (2013.01)

(58) Field of Classification Search
CPC .......... F03G 6/005; F03G 6/067; Y02E 10/44; Y02E 10/46
USPC ........... 60/641.8–641.15, 643, 655, 664, 666, 60/670
See application file for complete search history.

(56) References Cited

U.S. PATENT DOCUMENTS

| 4,438,630 | A | * | 3/1984 | Rowe .............................. 60/676 |
| 8,572,968 | B2 | * | 11/2013 | Schaal ........................ 60/641.8 |
| 2009/0320828 | A1 | | 12/2009 | Koketsu |
| 2012/0137683 | A1 | * | 6/2012 | Jurgen et al. ................. 60/641.8 |

FOREIGN PATENT DOCUMENTS

| AT | 362624 B | 6/1981 |
| CN | 101384819 A | 3/2009 |

(Continued)

*Primary Examiner* — Thomas Denion
*Assistant Examiner* — Laert Dounis

(57) ABSTRACT

A solar thermal power plant and a method using indirect evaporation are provided. The solar power plant includes a primary circuit having a heat transfer medium conduction system and at least one solar thermal subassembly for heating the heat transfer medium by means of solar energy, a steam secondary circuit having a steam turbine system, and a generator coupled to the steam turbine system. The heat exchanger includes a heat transfer medium conduction system to transfer the heat energy from the heat transfer medium of the primary circuit to the steam superheating stage, the steam generation stage and the preheating stage of the steam secondary circuit which has a bypass around the steam superheating stage and/or the steam generation stage which is fed back into the main current of the heat transfer medium conduction system upstream of the preheating stage.

13 Claims, 15 Drawing Sheets

(56) References Cited

FOREIGN PATENT DOCUMENTS

| | | | |
|---|---|---|---|
| DE | 102008051384 B3 * | 2/2010 | |
| EP | 2090777 A2 | 8/2009 | |
| FR | 2501840 A1 | 9/1982 | |
| WO | WO 2009034577 A2 | 3/2009 | |
| WO | WO 2010054911 A1 | 5/2010 | |
| WO | WO 2010149814 A2 | 12/2010 | |

* cited by examiner

SOLAR THERMAL POWER PLANT HAVING A BYPASS CONDUCTION PATH BYPASSING THE SUPERHEATING AND/OR STEAM GENERATION STAGES OF THE SOLAR CIRCUIT AND USING INDIRECT EVAPORATION AND METHOD FOR OPERATING SUCH A SOLAR THERMAL POWER PLANT

CROSS REFERENCE TO RELATED APPLICATIONS

This application is the US National Stage of International Application No. PCT/EP2011/052164, filed Feb. 15, 2011 and claims the benefit thereof. The International Application claims the benefits of German application No. 10 2010 013 363.9 DE filed Mar. 30, 2010. All of the applications are incorporated by reference herein in their entirety.

FIELD OF INVENTION

The invention relates to a solar thermal power plant using indirect evaporation, comprising a primary circuit having a heat transfer medium conduction system and at least one solar thermal subassembly for heating the heat transfer medium by means of solar energy, a steam secondary circuit having a steam turbine system, and a generator coupled to the steam turbine system. The invention further relates to a method for operating such a solar thermal power plant using indirect evaporation.

BACKGROUND OF INVENTION

Solar thermal power plants represent an alternative to conventional power generation from water power, wind power, nuclear power or fossil fuels. They make use of solar radiation energy to produce electrical energy and are embodied as solar thermal subassemblies with, for example, parabolic trough collectors, Fresnel collectors or solar tower receivers.

Such power plants typically comprise either a singular working fluid circuit system, in which a working fluid is directly evaporated in this circuit, or a first solar power plant section for the absorption of solar energy and a second, mostly conventional power plant section with a steam turbine system powered by a working fluid. This second power plant type with two separated circuit systems is referred to as a solar thermal power plant using indirect evaporation, since the solar energy is only employed here indirectly to evaporate the working fluid.

A conventional solar thermal power plant using indirect evaporation typically comprises a solar thermal subassembly such as, for example, a solar array made from parabolic trough collectors, Fresnel collectors or a tower receiver, wherein a heat transfer medium is heated, a heat exchanger group wherein the heat energy is transferred from the heat transfer medium to a working fluid in a steam circuit such as, for example, a water steam circuit, and optionally from a thermal storage tank. In the heat exchanger group, the heat energy is typically released in three stages from the primary circuit into the working fluid in the steam circuit, comprising preheating, evaporation and superheating. In solar thermal power plants using indirect evaporation, heat transfer oils, water, air or molten salts have been used up until now as the heat transfer medium in the primary circuit, wherein water is generally used as the working fluid of the secondary circuit in the steam circuit.

At present, parabolic trough collectors with heat transfer oil as a heat transfer medium, Fresnel collector solar arrays with water as a heat transfer medium and tower receiver power plants with molten salts, air or water as a heat transfer medium comprise the majority of these power plant types in use. Temperatures of up to 390° C. for heat transfer oil plants and temperatures of up to 550° C. for molten salts can be feasibly attained, though temperatures of up to 1100° C. can be attained with tower receivers using air as the heat transfer medium.

Superheating the working fluid in the steam circuit serves to increase the efficiency of the plant in solar thermal power plants; it is employed when operating steam turbines to prevent the turbine blades from being damaged by condensed drops of liquid which remain in the steam after the steam generation stage. At present, a steam turbine system comprising several steam turbines is often operated to improve the energy use of the hot heat transfer medium produced in solar thermal power plants. Here, one, two or more resuperheating processes are incorporated into the steam conduction system between the steam turbines, in particular in parabolic trough collector power plants using heat transfer oil as a heat transfer medium. During this resuperheating process, live steam generated in the superheating stage is conducted via a high-pressure turbine. Before entering the downstream (in terms of the steam direction) process unit, such as a mid-pressure or low-pressure turbine, the steam is then conducted into a resuperheater with one, two or more heat exchangers, where it is once again superheated by the hot heat transfer medium diverted before the superheating stage.

The presently most common method of connecting heat transfer media in a solar thermal power plant using indirect evaporation and single resuperheat is represented in FIG. 1. Here, the oil used as a heat transfer medium in the heat exchanger group is, on leaving the solar array, conducted first via the superheater, then via the evaporator and finally via the preheater of the secondary circuit. In addition, part of the hot oil is diverted before the superheater and is conducted via a resuperheating stage.

A further possibility for connection is to carry out the first resuperheating stage in two devices, or to superheat the steam a second time in a second resuperheating stage. Potential connection variants for solar thermal power plants using indirect evaporation and single or dual resuperheat are, for example, summarized in the Siemens patent applications WO 2009034577 A2 and WO 2010054911. All connection variants described therein are accepted with reference to this patent specification as the basic connection variants for the present invention.

SUMMARY OF INVENTION

An object of the present invention is to improve the overall efficiency of a solar thermal power plant using indirect evaporation as well as to improve a method for operating a solar thermal power plant of the type described above.

This object is achieved on the one hand by a solar thermal power plant using indirect evaporation according to the claims, and on the other hand by a method for operating a solar thermal power plant using indirect evaporation according to the claims.

A solar thermal power plant using indirect evaporation, as is described above, has at least one primary circuit having a heat transfer medium conduction system, a steam secondary circuit having a preheating stage, a steam generation stage, a steam superheating stage and a steam turbine system, and a generator coupled directly or indirectly to the steam turbine system for producing electrical output. Moreover, in the primary circuit, at least one solar thermal subassembly is required, which serves to heat by means of solar energy the heat transfer medium conducted in the primary circuit.

The solar thermal power plant using indirect evaporation according to the invention has, in the primary circuit, a heat exchanger group with a heat transfer medium conduction system for transferring heat energy from the heat transfer medium of the primary circuit to the steam superheating stage, the steam generation stage and the preheating stage of the steam secondary circuit. To increase the overall efficiency of the power plant, it features an optimized transfer of heat energy from the primary circuit (solar array circuit) to the secondary circuit (steam circuit), in that the heat transfer medium conduction system of the heat exchanger group has at least one bypass conduction path around the steam superheating stage and/or the steam generation stage of the secondary circuit. According to the invention, bypass is understood to be a system of pipes in which a partial current of the heat transfer medium is extracted from the main current of the heat transfer medium before or after the steam superheating stage, is conducted around a component and/or a subassembly and/or a construction stage and fed back into the main current of the heat transfer medium before the preheating stage. The component and/or subassembly and/or construction stage around which this current circulates is here the steam superheating stage (or steam superheater) and/or the steam generation stage (or steam generator). A component and/or a subassembly and/or a construction stage also fall under the definition of "bypass" when they are situated in this bypass, as long as the bypass is fed back into the main current of the heat transfer medium after being circulated around the respective component, subassembly, and/or construction stage, but in any case before the preheating stage.

This connection enables a clear potential for optimizing the overall efficiency, particularly at high process temperatures in the primary circuit (solar array circuit) and/or the secondary circuit (steam circuit). In particular, the use of molten salts or other heat transfer media such as supercritical $CO_2$, sulfur-based heat transfer media or heat transfer oils with a high boiling point is conceivable, in the future and in the power plant types described herein, as a heat transfer medium in the primary circuit of a solar thermal power plant, in particular one with parabolic trough collectors or Fresnel collectors. These heat transfer media enable, among other things, higher process temperatures, but can also require, for example, higher return temperatures for the solar thermal subassembly (solar array) in the primary circuit, since they otherwise crystallize or lead to agglutination, for example. Here, a quite critical point in the heat exchanger is the preheating stage, in which agglutinations of crystallized heat transfer media (molten salts) occurred regularly in preceding connections variants, such as, for example, the known connection variant shown in FIG. 1. By connecting the primary circuit in the heat exchanger group according to the invention, the return temperature can be raised or adjusted above the critical temperature (crystallization temperature, agglutination temperature), so that molten salts can now also be used in such power plant types. Furthermore, higher process temperatures are possible and the overall efficiency can be optimized.

For the generation of superheated steam, the steam secondary circuit comprises at least one preheating stage for the preheating of feedwater, a steam generation stage downstream from the preheating stage for the generation of steam, and a steam superheating stage downstream from the steam generation stage for the superheating of steam. These three stages are typically connected in series, wherein several such units for generating superheated steam can also be connected in parallel in the secondary circuit. This means that each individual stage represented in the figures can contain not only one, but also two or more preheaters and/or preheating units, steam generators and/or steam generation units and steam superheaters and/or steam superheating units arranged in parallel.

In addition, the steam secondary circuit comprises a steam turbine system which is linked to the steam superheating stage via a steam conduction system and, when operational, is fed with the steam generated and superheated therein. The steam turbine system can comprise a single steam turbine, wherein several turbine modules are typically used to improve energy use and to increase energy efficiency. Then one, two or more mid-pressure turbines and/or low-pressure turbines can be connected in series to the high-pressure turbine(s). This/these mid-pressure and/or low-pressure turbine(s) downstream from the high-pressure turbine in the direction of the steam are fed with the steam from the high-pressure turbine(s), which has been superheated with one, two or more heat exchangers in a resuperheater in-between. A cascade of high-pressure, mid-pressure and low-pressure turbines is advantageous for increasing the efficiency and/or the total output of the power plant.

Moreover, in the secondary circuit, a condenser and/or a condensing system is connected downstream from the steam turbine system on the exhaust steam side to recondense the steam. The system according to the invention can also comprise one or more conduction paths for extraction steam. This extraction steam can, for example, be used to preheat the feedwater in a feedwater preheating system etc. Moreover, the secondary circuit comprises a water conduction system with a feedwater tank located between the condensing system and the preheating stage, which supplies the feedwater. Likewise, the water conduction system comprises the typical valves, pumps and control units which control the water conduction system and/or the steam conduction system and regulate the generation of steam, both when the power plant is in operation and when it is offline.

Water is typically used as the feedwater in the system according to the invention, but other evaporable working fluids with advantageous enthalpy values can also be used. The expressions "water, "steam" and "feedwater" should not be interpreted as being restrictive and can generally be replaced by other working fluids.

In the operating method according to the invention, when operational, a heat transfer medium is heated by means of a solar thermal subassembly using solar energy and the heated heat transfer medium is conducted into a heat exchanger group to transfer heat energy from the heat transfer medium to a secondary circuit, before it is fed back into the solar thermal subassembly after having cooled down. In the steam secondary circuit, feedwater from a feedwater tank is preheated in the heat exchanger group in a preheating stage, steam is generated in a steam generation stage downstream from the preheating stage and the steam is superheated in a steam superheating stage downstream from the steam generation stage. Then a steam turbine system coupled directly or indirectly to a generator is fed with the superheated steam via a steam conduction system. Then the steam discharged from the steam turbine system is condensed into water in a condenser system and conducted back to the feedwater tank.

According to the invention, a partial current of the heat transfer medium of the primary circuit is conducted in the heat exchanger group via at least one bypass conduction path around the steam superheating stage and/or the steam generation stage of the secondary circuit. Thus the heat energy absorbed in the solar thermal subassembly by the heat transfer medium can be transferred more flexibly, and thus higher process temperatures may intentionally be used in the primary and/or secondary circuit.

A central object of the idea is therefore to conduct a partial current of the hot heat transfer medium of the primary circuit in a bypass conduction path around at least the steam superheating stage or the steam generation stage. This allows the return temperature of the heat transfer medium in the primary circuit to be maintained above the critical levels at which crystallization or agglutination may occur, depending on each heat transfer medium used, such as in the preheating stage or the return conduction system to the solar thermal subassembly, i.e. in particular above the crystallization temperature.

Moreover, the heat management in the transfer of heat from the primary circuit to the secondary circuit can be improved by the bypass, thereby improving the overall efficiency of the method. This is achieved primarily by the optimized connection of the heat exchanger group (and/or the heat exchangers and/or heat transfer groups in the heat exchanger group) in the method, as well as the increase in overall process temperature made possible thereby.

The potential connection variants represented here refer, among other things, to solar thermal power plants operated with molten salts as the heat transfer medium in the primary circuit, as these power plants and operating processes exhibit a better optimization potential due to their higher attainable process temperatures. The connections can, however, also fundamentally be used for various other heat transfer media, which are used and/or should be used as the primary circuit medium in a solar thermal power plant (in particular based on parabolic trough collector technology, Fresnel collector technology or solar tower technology). Supercritical $CO_2$, sulfur-based heat exchangers, heat transfer oils etc. can, for example, be used as advantageous heat transfer media in these operating methods.

In the simplest variant of the power plant and method according to the invention, the heat exchanger systems can be embodied single-strandedly (1 heat exchanger group). In alternative variants, the heat exchanger systems can also be embodied multi-strandedly (at least one heat exchanger group connected in parallel). Moreover, in further embodiments, individual devices and/or constructional units are embodied single-strandedly or multi-strandedly in the heat exchanger groups. Whether a single-stranded or multi-stranded embodiment of the heat exchanger groups or of the individual instruments and/or construction units is preferable is above all dependent on the size and type of the power plant. A multi-stranded embodiment of the heat exchanger and/or the heat exchanger groups is particularly advantageous when very large heat outputs are to be transferred.

The dependent claims and the following description contain particularly advantageous arrangements and developments of the invention, wherein it is explicitly noted that the method according to the invention can also be developed according to the dependent claims for the solar thermal power plant, and vice versa.

In one embodiment of a solar thermal power plant according to the present invention, an additional steam superheating stage can be situated in the bypass conduction path around the steam superheating stage, for example a resuperheating stage to re-superheat the exhaust steam discharged from a high-pressure turbine. This re-superheated steam can then be reused in a mid-pressure or low-pressure turbine stage. Alternatively, the steam generation stage can also be located in the bypass conduction path instead of, or in addition to, an additional steam superheating stage. This means that, in the heat exchanger group of this embodiment, the steam superheating stage and the steam generation stage of the secondary circuit are charged in parallel with hot heat transfer medium from the primary circuit. Thus process parameters, such as a pinch point for various process parameters, can be adjusted selectively. This produces an increase in efficiency in comparison with a typical connection in series of a steam superheating stage and a steam generation stage, wherein these ancillary conditions for the process parameters (e.g. the pinch point) can only be maintained at the cost of a reduction in efficiency.

In a further alternative variant of the solar thermal power plant according to the invention, an additional steam superheating stage can be situated in the bypass conduction path around the steam generation stage, such as, for example, a resuperheat for the exhaust steam from the high-pressure or mid-pressure turbine stage. This resuperheat connection is advantageous in that colder heat transfer medium appropriate to the temperature level can first be used to preheat the steam, and the superheating to the desired final temperature can take place using hot heat transfer medium. This resuperheat connection can be embodied in one or two devices. The advantage of two devices is that there is less thermal stress.

Further connection variants for increasing the overall efficiency of a solar thermal power plant according to the invention may have a conduction path around the preheating stage in the heat transfer medium conduction system. This conduction path around the preheating stage is not a bypass conduction path as defined above, as it is not fed back into the main current before the preheating stage. Optionally, one or more additional steam superheaters and/or a steam superheating stage may be situated in this conduction path, for example for a first or second resuperheat. This connection is adapted to the situation that a colder heat transfer medium appropriate to the temperature level is first used to preheat the steam in the resuperheating stage, before the superheating to the desired final temperature takes place using hot heat transfer medium. Depending on the necessary temperature, the hot heat transfer medium can be diverted directly before the steam superheating stage or between the steam superheating stage and steam generation stage.

In a typical resuperheat, the heat transfer medium is diverted before the steam superheating stage and is only fed back into the main current after the preheating stage. This is not a bypass around a steam superheating stage or steam generation stage in the meaning of the present invention, as these are not fed back into the main current before the preheating stage. According to the invention, the solar thermal power plant can, however, also have a heat transfer medium conduction system having an additional conduction path, which circumvents the steam superheating stage and the steam generation stage. Optionally, this conduction path can also circumvent the preheating stage, wherein it does not comprise a bypass in the meaning of the invention. An additional steam superheating stage may be optionally situated in this conduction path with, for example, one or more resuperheaters.

As has already been discussed in the above variants, the additional steam superheating stage may be a resuperheating stage in the solar thermal power plant according to the invention. Typical resuperheating stages can be subdivided into first and second resuperheating stages. The first resuperheat typically serves to resuperheat the steam discharged from the high-pressure turbine, which is then used in a mid-pressure or low-pressure turbine. The second resuperheat typically serves to superheat the steam discharged from the mid-pressure turbine, which is then used in the low-pressure turbine. A preferred embodiment according to the invention is one where the resuperheating stage comprises at least two resuperheating stages, which can each optionally comprise several resuperheating devices. Depending on the temperature requirements for the resuperheat, a bypass, for example, is diverted before or after the steam superheating stage and is returned and fed back into the heat transfer medium conduction system (or main current) either before or after the steam generation stage depending on the temperature levels achieved after the first and/or second resuperheating stage. A combination with the preceding connection variants, for example with a bypass, with or without the steam generation unit, around the steam superheating stage or with a bypass around the steam generation stage, increases the flexibility for adjusting the necessary process parameters and serves simultaneously to optimize heat management. It can thus contribute towards an increase in overall efficiency.

The intermediate thermal storage tank used in typical solar thermal power plants can, according to the invention, also be located in the primary circuit and/or in the secondary circuit. Among other things, these serve to store thermal energy in the storage operating mode and/or to remove hot heat transfer medium and/or superheated steam in the removal operating mode.

To provide a store of hot or cold heat transfer medium, particularly in liquid phase, in a solar thermal power plant according to the invention one, or more storage tanks for the heat transfer medium can be additionally located upstream or downstream from the solar thermal subassembly in the primary circuit.

Additionally, in such a solar thermal power plant, the solar thermal subassembly can comprise one or more solar collectors connected to each other, or an entire array of solar collectors. For this application, all commonly used collector types may serve as solar collectors, such as, for example, trough collectors or Fresnel collectors. These may each be arranged in series, according to the incident solar radiation and the required space. Alternatively, the solar thermal subassembly may also comprise several mirrors and a tower receiver to collect the solar energy.

BRIEF DESCRIPTION OF THE DRAWINGS

The invention is clarified in greater detail by means of exemplary embodiments in accordance with the appended illustrations. The following are shown.

DETAILED DESCRIPTION OF INVENTION

Figure 1:
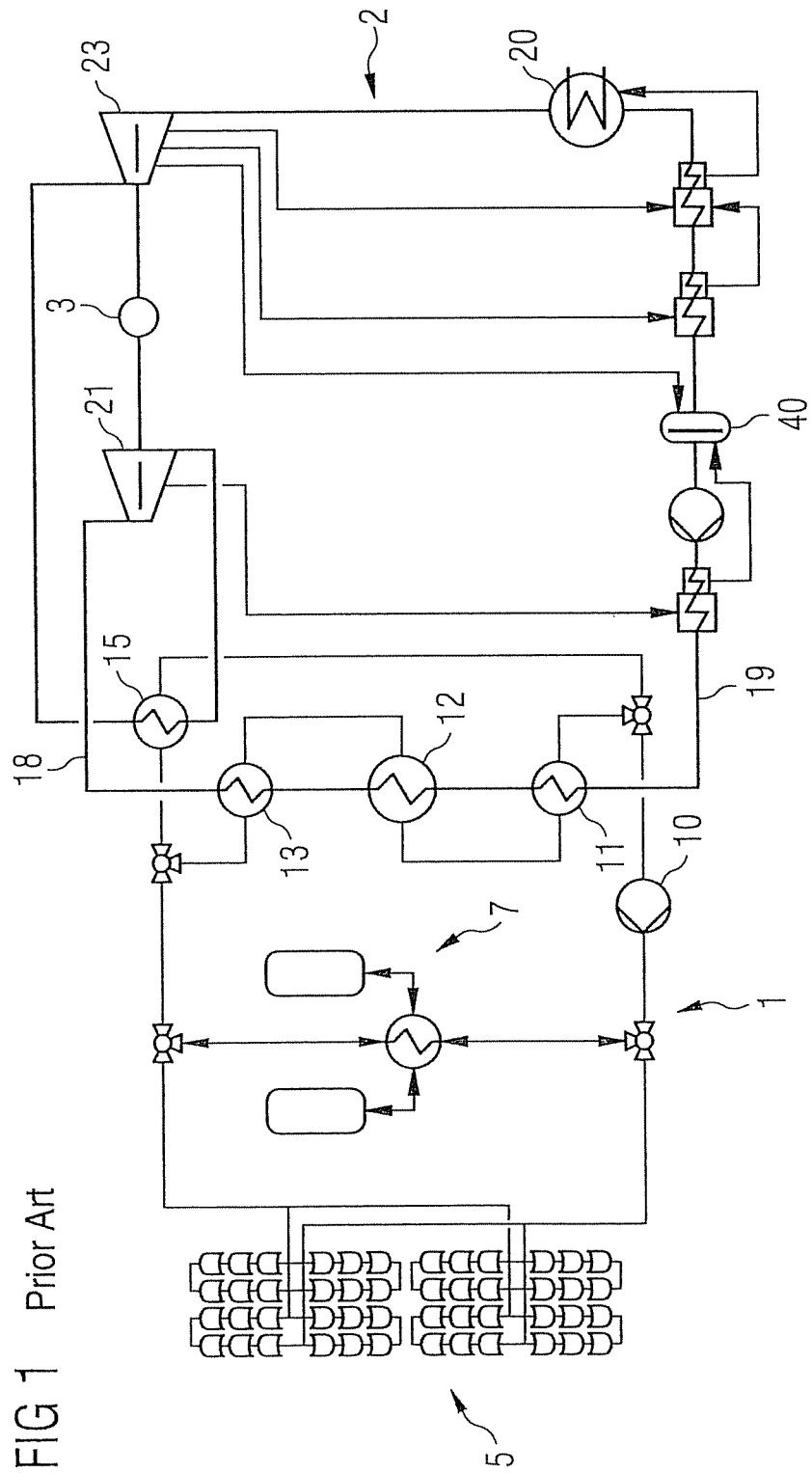
FIG. 1 shows a simplified schematic block diagram of a basic concept for a connection variant according to the prior art, which is conventionally used for solar thermal power plants with heat transfer oil as the heat transfer medium in the primary circuit, and which comprises a resuperheat.

A connection variant for solar thermal power plants using heat transfer oil as the heat transfer medium in the primary circuit 1 on which most of the exemplary embodiments clarified in greater detail herein are based is shown in FIG. 1. Here, the steam generation system of the secondary circuit in the heat exchanger group consists conventionally of a series circuit comprising, as standard, the preheating stage 11 (also known as the preheater), the steam generation stage 12 (also known as the evaporator) and the steam superheating stage 13 (also known as the superheater). Moreover, a resuperheat 15 is usually incorporated to increase the efficiency of the power plant.

In addition, the steam secondary circuit 2 comprises a steam turbine system 21, 22, 23, which is linked to the steam heating stage 13 via a steam conduction system 18 and, when operational, is fed with the superheated steam generated therein. A generator 3 is directly or indirectly coupled to the turbine. The steam turbine system 21, 22, 23 may comprise a single steam turbine, wherein typically two or more high-pressure turbines 21 are operated in parallel or as a dual turbine for improved energy use and increased efficiency. One, two or more mid-pressure turbines 22 and/or low-pressure turbines 23 can be connected to the high-pressure turbine(s) 21 in series. These mid-pressure turbine(s) 22 and low-pressure turbine(s) 23 downstream from the high-pressure turbine(s) 21 in the direction of the steam are fed with steam from the high-pressure turbine(s) 21, which have been resuperheated in a resuperheater with one, two or more heat exchangers. A cascade of high-pressure, mid-pressure and low-pressure turbines is also advantageous for increasing the efficiency and/or total output of the power plant.

Moreover, a condenser or condensing system 20 is installed downstream from the steam turbine system 21, 22, 23 on the exhaust steam side in the secondary circuit to recondense the steam. The system according to the invention may also comprise one or more conduction paths for extraction steam. This extraction steam can, for example, be used to preheat the feedwater in a feedwater preheating system, etc. Moreover, the secondary circuit also comprises a water conduction system 19 with at least one feedwater tank 40 located between the condensing system 20 and the preheating stage, which serves to supply the feedwater. In addition, the water conduction system comprises the typical valves, pumps and control units, which control the water conduction system 19 and/or the steam conduction system 18 when the power plant is both operational and offline and regulates the generation of steam.

Figure 2:
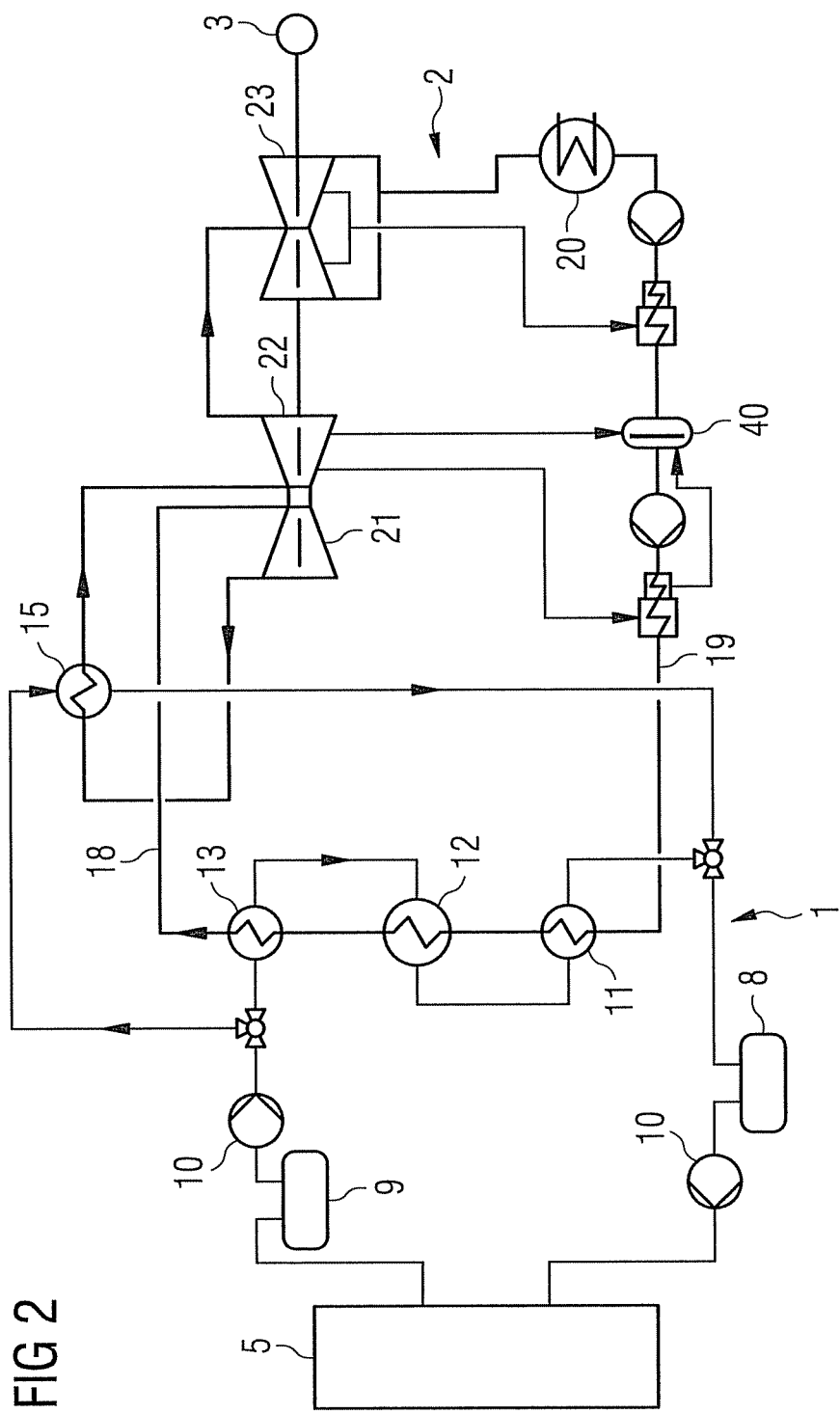
FIG. 2 shows a schematic block diagram of a conceivable simple connection variant for solar thermal power plants, comprising two storage tanks for heat transfer media in the primary circuit.

For the use of heat transfer media other than heat transfer oils requiring a high process temperature, such as, for example, molten salts, it is advantageous to modify these basic connection variants. Such a modified system specifically adapted to molten salts as an alternative heat transfer medium is shown in FIG. 2. In the primary circuit, two storage tanks 8, 9 are incorporated into the system for the heat transfer medium. The first storage tank 8 is located directly in front of the solar thermal subassembly 5 and serves to store cold heat transfer medium. The second storage tank 9 is located behind the solar thermal subassembly 5 and serves as a temporary storage tank for hot heat transfer medium. Downstream from both storage tanks is a pump 10 for circulation of the appropriate quantity of heat transfer medium in operating mode.

The use of such a modified, conventional solar thermal power plant using indirect evaporation showed, however, reductions in efficiency due to disadvantageous return temperatures in the main current of the primary circuit. Moreover, crystallization problems, etc. occurred with the use of molten salts, such as, for example, in the heat transfer medium storage tank 8 or in the heat transfer pump 10 downstream from this storage tank 8. Therefore this system is further improved and adapted to the changed process conditions at higher temperatures. These improvements and modifications are illustrated in greater detail in the following exemplary embodiments, without fundamentally altering the general scheme of the system for indirect evaporation.

Figure 3:
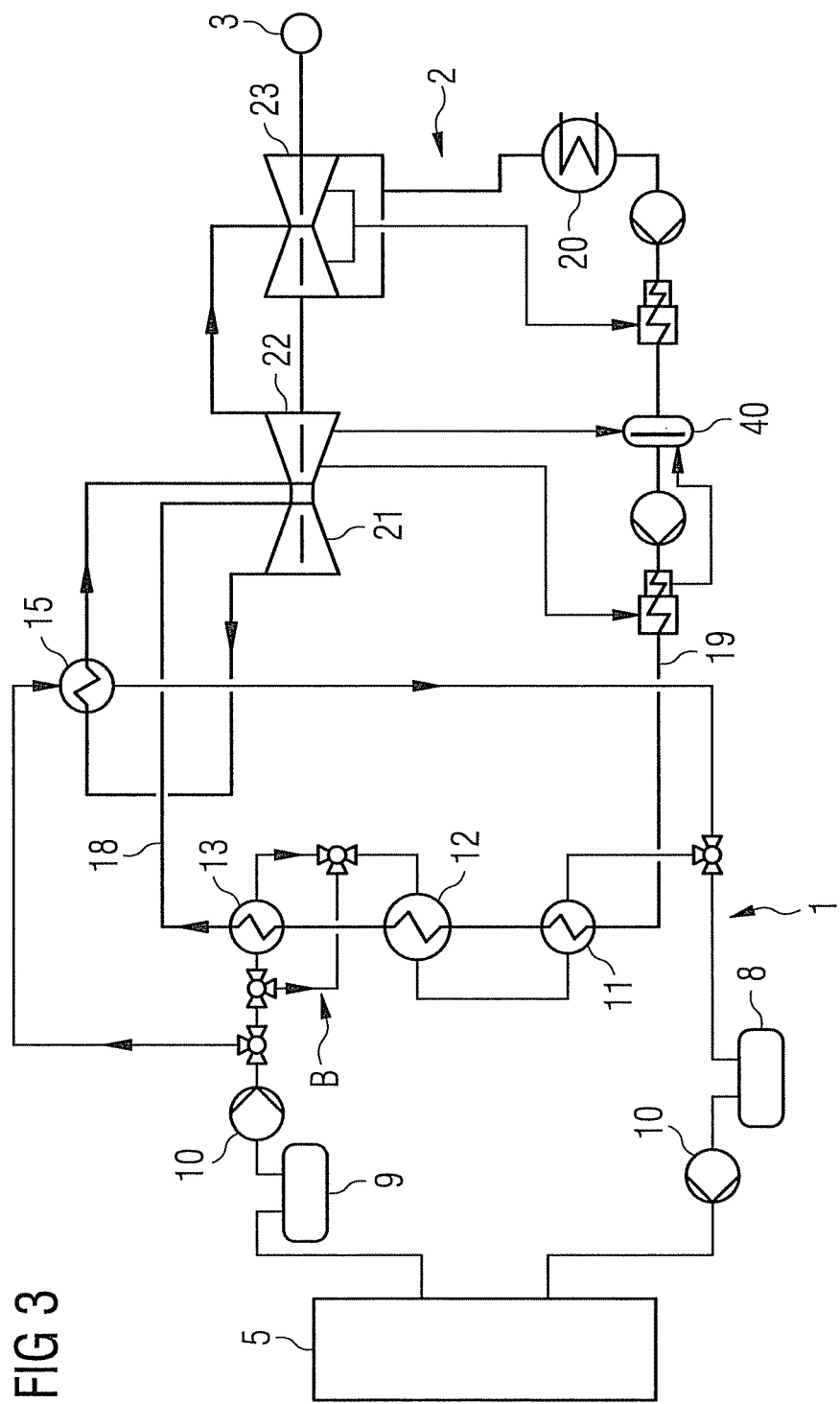
FIG. 3 shows a schematic block diagram of a first exemplary embodiment of a solar thermal power plant using indirect evaporation and simple resuperheat according to the invention, wherein a bypass is located around the steam superheating stage.

A first exemplary embodiment for the improvement of the overall efficiency and for an additional solution to the crystallization problem mentioned above is shown in FIG. 3. The primary and secondary circuits are fundamentally designed analogously to the conceivable connection system shown in FIG. 2. However, in this first exemplary embodiment, a sub-quantity of hot heat transfer medium is conducted around the steam superheating stage 13 (superheater) and fed back into the main current after the steam superheating stage 13. This means that a partial current of the heat transfer medium is conducted in a bypass B around the steam superheating stage 13.

It has been established that, when using heat transfer media in the primary circuit 1 that remain in a single phase throughout the entire operating temperature range, a pinch point of larger than 3K should be adhered to at the steam generation stage 12 (or evaporator) due to the evaporation of water in the secondary circuit 2 which takes place at a constant temperature (depending on evaporating pressure). Due to these constraints, it is typical for heat transfer in conventional systems to occur under worse process parameters, resulting in a reduction in efficiency of the overall system. However, by bypassing the steam superheating stage 13, evaporation of the working fluid in the steam generation stage 12 of the secondary circuit can be guaranteed, and at the desired pinch point. At the same time, the process parameters adapted to each heat transfer medium can be maintained due to this bypass conduction path (bypass B), so that agglutination and/or crystallization can be prevented in the preheating stage 11 or in the downstream operation units by regulating the necessary partial current of hot heat transfer medium accordingly. This means that more heat energy can be conducted around the steam superheating stage 13 via the bypass B and can be fed back into the steam generation stage 12 so that the temperature at the critical points of the primary circuit can be adjusted to the required temperatures, e.g. above the crystallization temperature.

Figure 4:
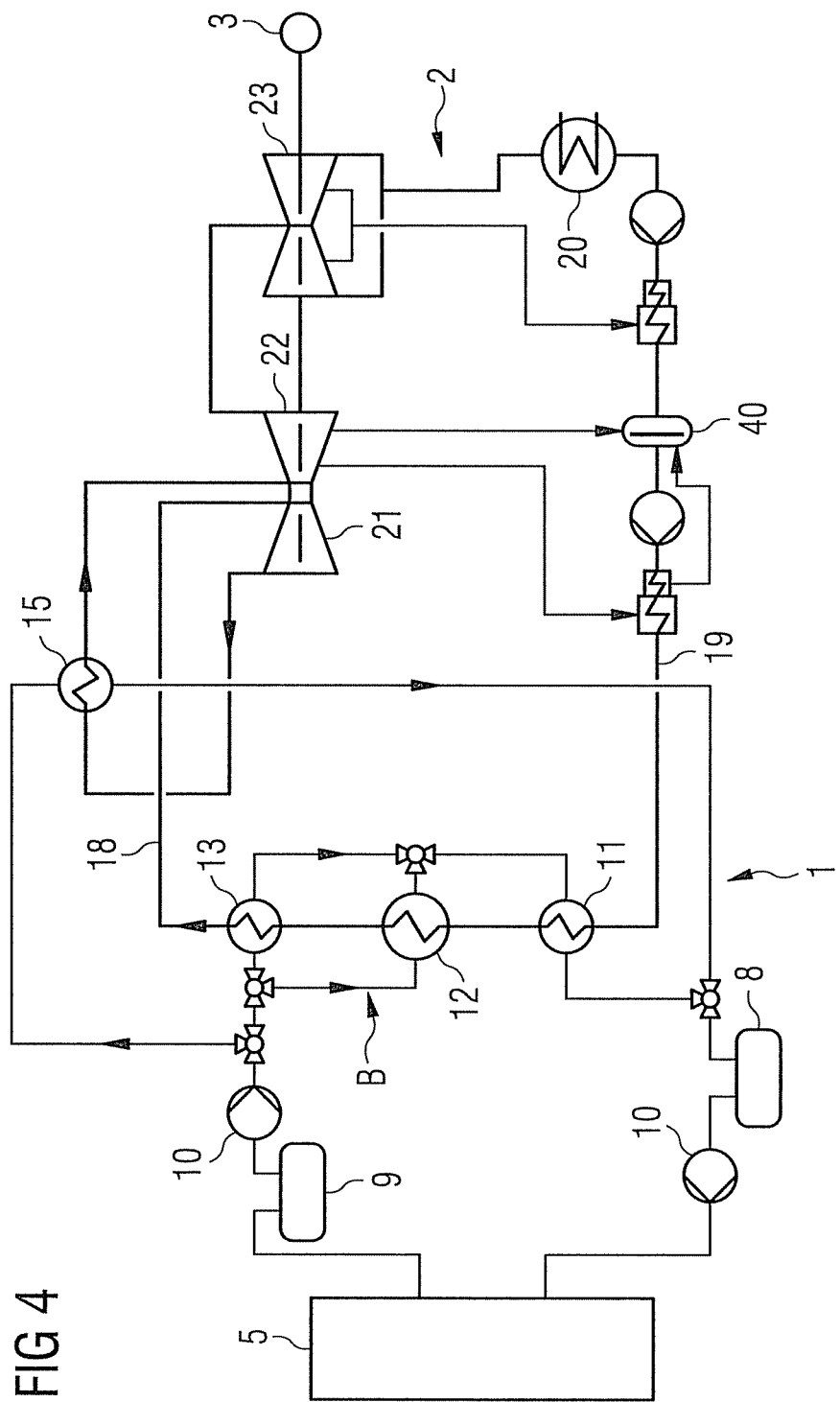
FIG. 4 shows a schematic block diagram of a second alternative exemplary embodiment of a solar thermal power plant using indirect evaporation and simple resuperheat according to the invention, wherein the steam generation stage is located in the bypass around the steam superheating stage.

FIG. 4 shows a second alternative exemplary embodiment of the system according to the invention. By installing a bypass B around the steam superheating stage 13 (or superheater) and simultaneously installing the steam generation stage 12 (or evaporator) into this bypass, the process parameters can likewise be improved. In other words, this bypass conduction path (bypass B) is a parallel connection of the steam superheating stage 13 and the steam generation stage 12. When the steam generation stage 12 and the steam superheating stage 13 are connected in parallel, both stages are charged with the hot heat transfer medium. In particular as a result of the raise in temperature in the steam generation stage 12 thereby achieved, the pinch point under otherwise identical process parameters can be adhered to more easily. At the same time, the heat management of the overall system can be adapted individually to the heat transfer medium used. Due to this parallel connection of the steam superheating stage 13 and the steam generation stage 12, heat management can be noticeably improved, in particular when alternative heat transfer media are being used, such as molten salts or heat transfer oils with higher boiling points; this results in an increase in the efficiency of the overall system.

Figure 5:
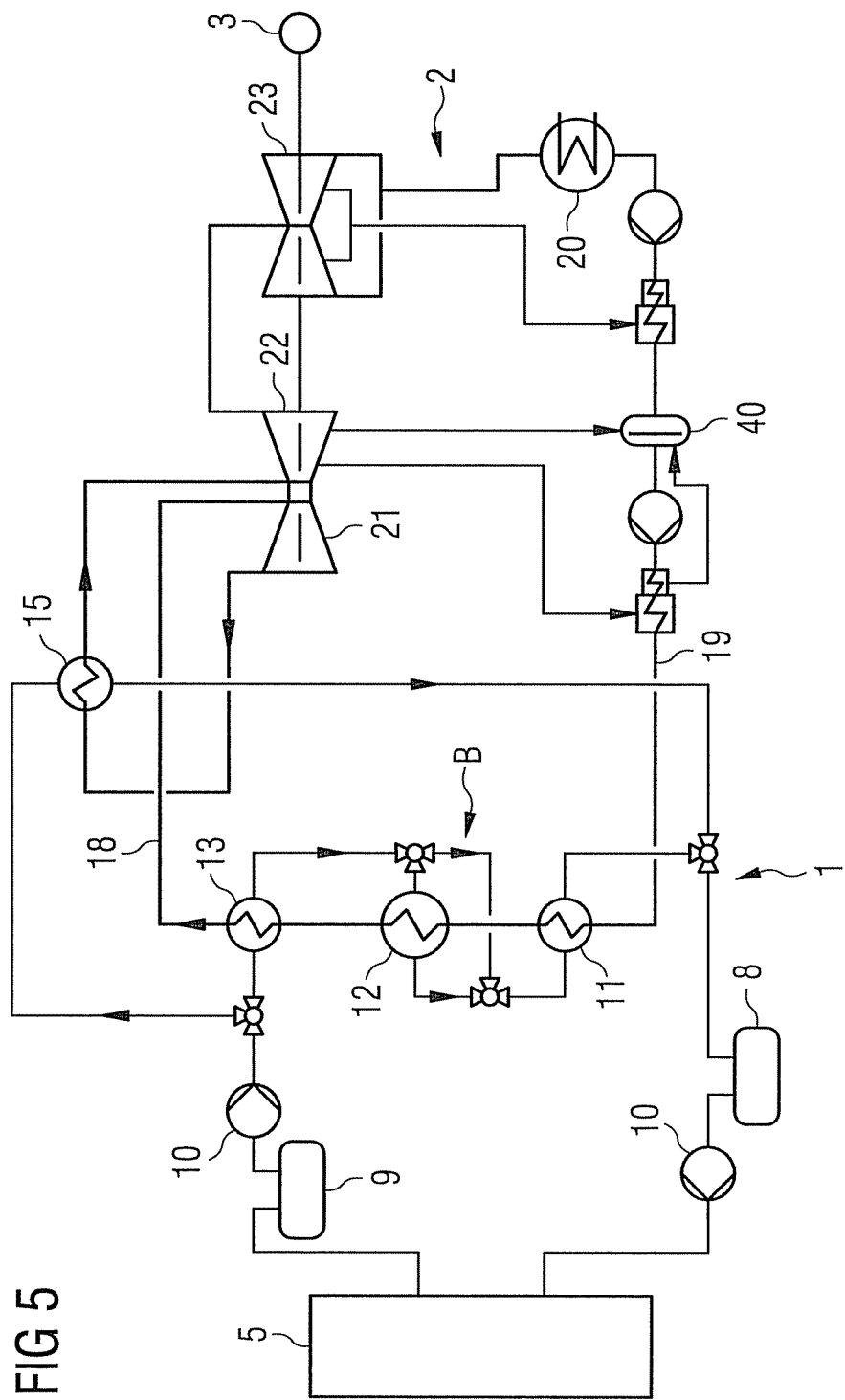
FIG. 5 shows a schematic block diagram of a third alternative exemplary embodiment of a solar thermal power plant using indirect evaporation and simple resuperheat according to the invention, wherein a bypass is located around the steam generation stage.

In a third alternative exemplary embodiment of the connection of a solar thermal power plant according to the invention, the steam generation stage 12 is, with an analogous basic connection layout (according to FIG. 2), equipped with a bypass conduction path or bypass B. This variant is shown in FIG. 5.

As well as improving efficiency, the stability of the heat exchange process and/or the stability of the steam generation can additionally be ensured due to this ingenious connection variant. Here, a partial current of the heat transfer medium is conducted around the steam generation stage 12 (or evaporator) in order to achieve a stable production of steam under extreme operating conditions, e.g. very high molten salt temperatures and/or agglutination temperatures of the heat transfer medium. In particular, with this connection, critical operating states can be prevented, such as the freezing of the heat transfer medium, which can occur in heat transfer media with high melting points.

Figure 6:
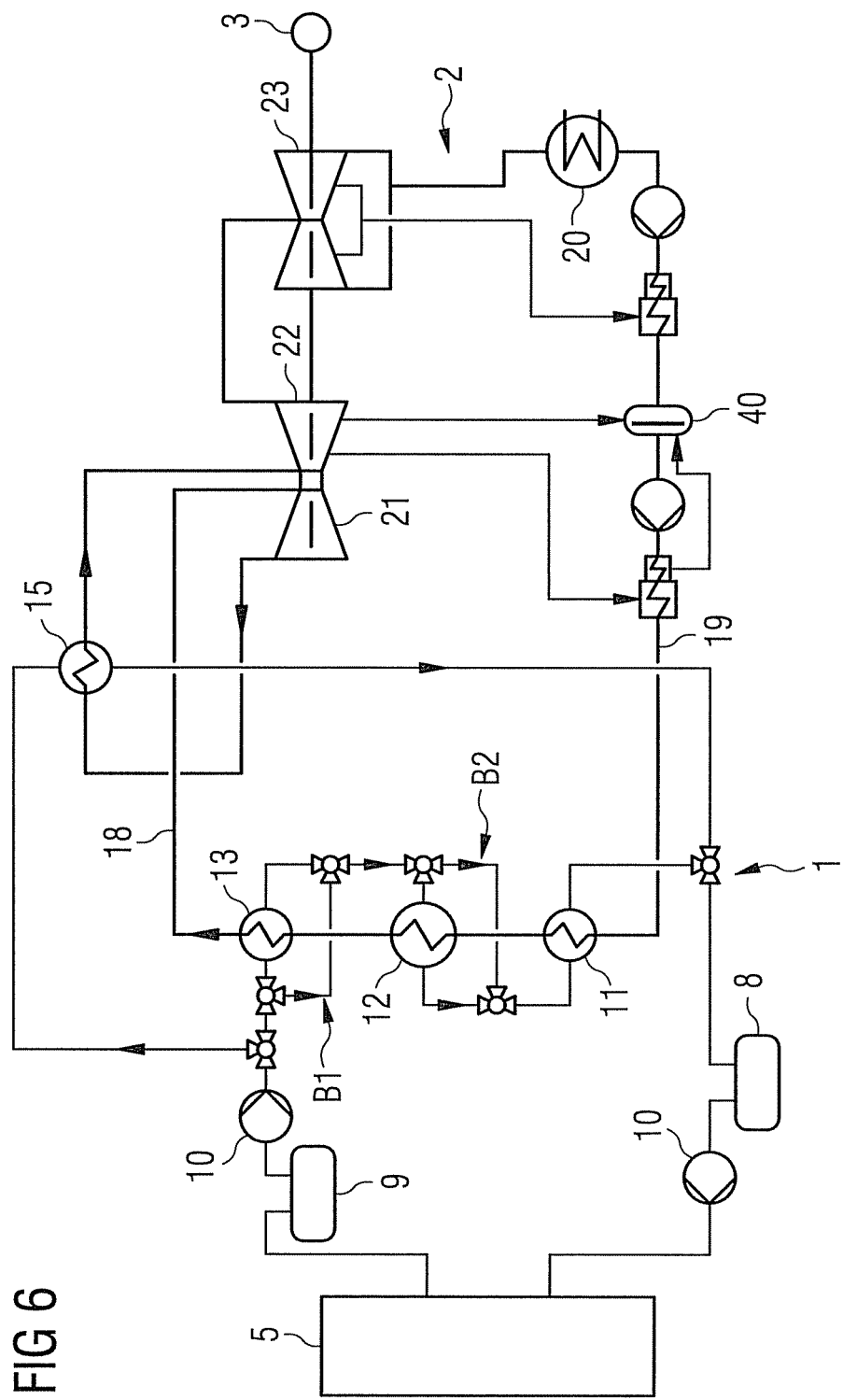
FIG. 6 shows a schematic block diagram of a further alternative exemplary embodiment of a solar thermal power plant using indirect evaporation and simple resuperheat according to the invention, wherein a bypass is located around both the steam superheating stage and around the steam generation stage.

This connection variant can be combined with both basic connection variants from the first and/or second exemplary embodiment. This means that both a first bypass B1 around the steam superheating stage 13 and a second bypass B2 around the steam generation stage 12 can be present in the heat exchanger system. Such a combination of both bypasses B1 and B2 is shown in FIG. 6. Here, the combination of a first bypass B1 around the steam superheating stage 13 (or a superheater bypass) and a second bypass B2 around the steam generation stage 12 (or an evaporator bypass) in a solar thermal power plant according to the invention is shown as an example.

In addition to the aforementioned exemplary embodiments, the bypass around the steam superheating stage 13 and/or the steam generation stage 12 can, according to the invention, be used not only to optimize heat management, but also to resuperheat the steam discharged from the high-pressure turbine. Various connection variants are conceivable here and some of them will be illustrated below by means of further exemplary embodiments to illustrate the invention. All connection variants can also be embodied in combination with the basic connection variants illustrated above in the first to third exemplary embodiments.

Figure 7:
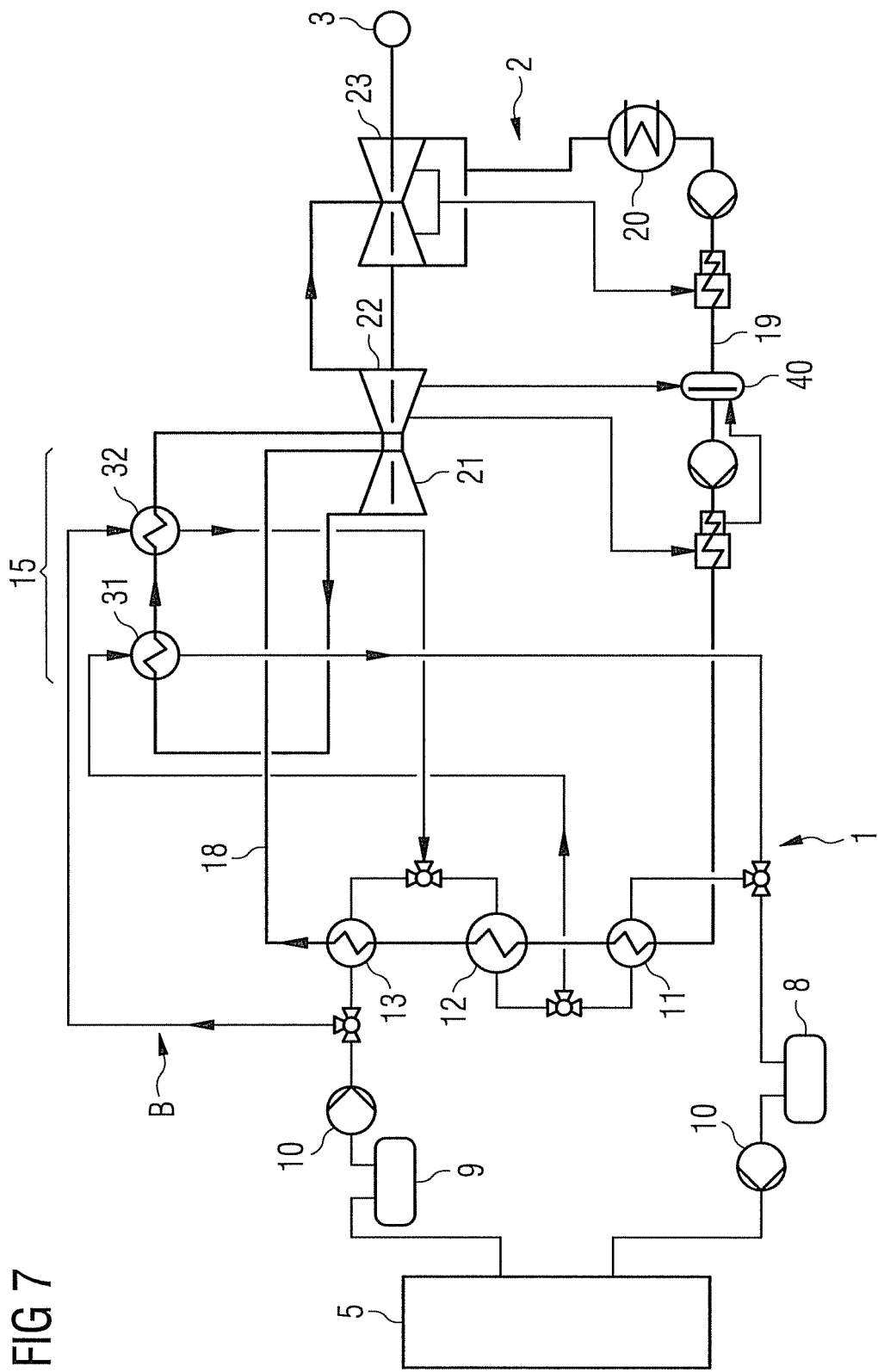
FIG. 7 shows a schematic block diagram of a further alternative exemplary embodiment of a solar thermal power plant using indirect evaporation according to the invention, comprising a dual removal of the heat transfer medium from the steam generation system via a bypass around the steam superheating stage for resuperheat.

In a first alternative embodiment of such a solar thermal power plant with a bypass for resuperheating, removing the heat transfer medium from the steam generation system at an appropriate temperature level enables the steam to be resuperheated in an optimized manner. A preferred exemplary embodiment for this is shown in FIG. 7. In this variant, a first superheating is carried out in resuperheating stage 15 in a first resuperheating device 31 using a heat transfer medium removed after the steam generation stage 12. Then a second superheating is carried out in a second resuperheating device 32 using hot heat transfer medium diverted before the steam superheating stage 13. The advantage of such a connection is that, by removal at an appropriate temperature, only high-value (hot) heat transfer medium suitable for superheating to the desired final temperature is used.

Depending on the temperature level of the de-superheated heat transfer medium, it is fed back into the main current of the heat transfer medium after the steam has been superheated in the resuperheating stage 15. Thus the residual heat of the de-superheated heat transfer medium can be optimally used to heat the feedwater, for example in the preheating stage 11 or the steam generation stage 12. In the exemplary embodiment shown in FIG. 7, the heat transfer medium is, after having been de-superheated in the resuperheating device 32, fed into the main current according to the temperature level after the steam superheating stage 13, or after preheating stage 11 after having been de-superheated in the resuperheating device 31.

The first resuperheating discharge is therefore conducted around the steam superheating stage 13 in a bypass B according to the invention, as shown in FIG. 7. The refeeding in accordance with the temperature level of the de-superheated heat transfer medium further improves heat management, as the remaining energy in the de-superheated heat transfer medium can still be employed in a further heat exchanger stage, thus increasing the efficiency of the plant. It should be taken into account during the planning phase that the additional piping and the additional heat transfer units (heat exchangers) result in higher investment costs. However, these one-time expenditures generally pay for themselves rather quickly due to the increased efficiency of the plant. This connection variant can also be embodied in combination with the preceding three basic bypass variants from the first to third exemplary embodiments, even if they are not explicitly described here.

Figure 8:
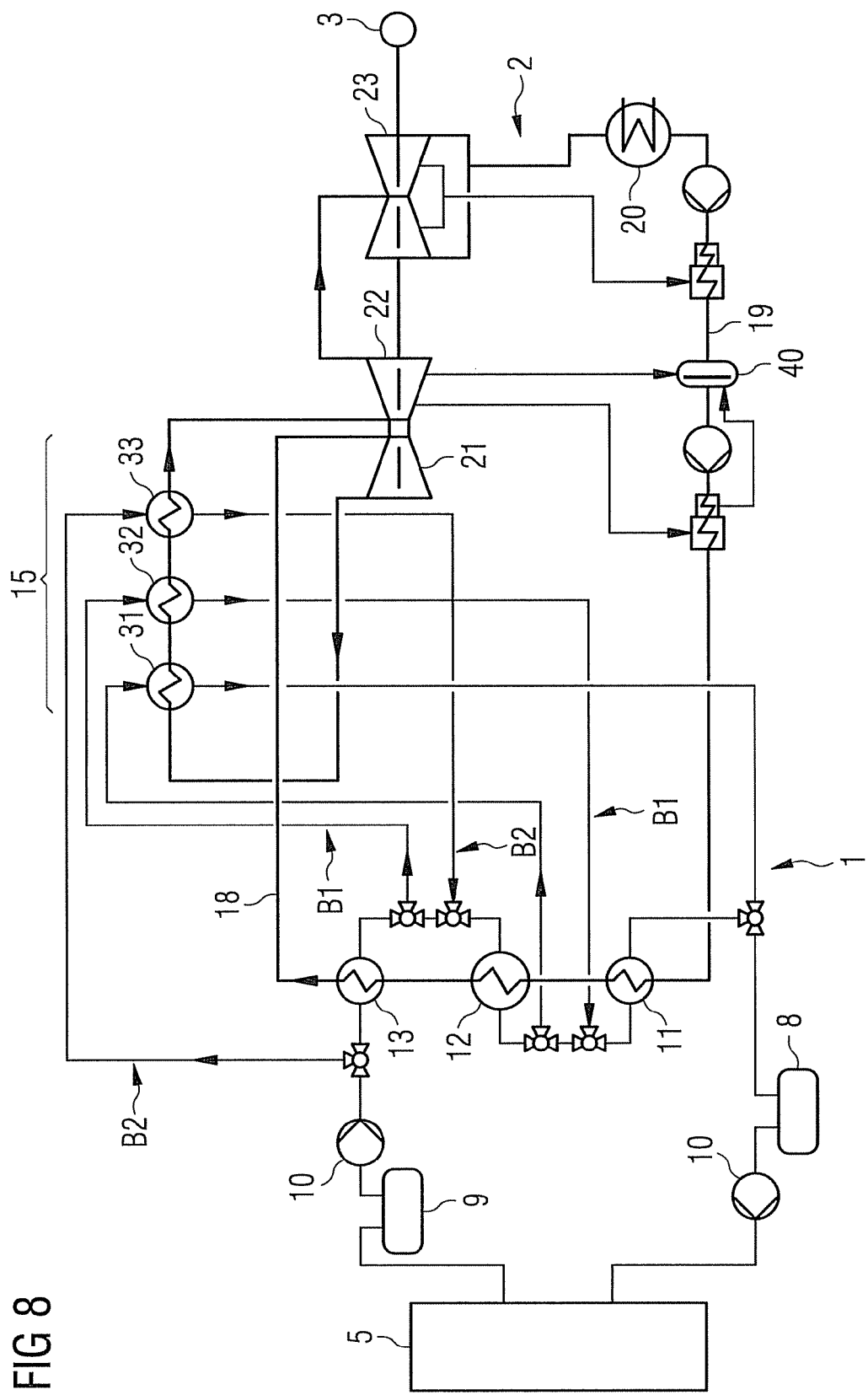
FIG. 8 shows a schematic block diagram of a further exemplary embodiment of a solar thermal power plant using indirect evaporation according to the invention, comprising a threefold removal of the heat transfer medium from the steam generation system, with a bypass around each of the steam superheating stage and the steam generation stage for resuperheat.

As in the exemplary embodiment illustrated above, the overall efficiency can be increased even further in the next alternative exemplary embodiment (see FIG. 8), which features a threefold or manifold removal of the heat transfer medium at an appropriate temperature level. This connection variant is fundamentally composed as per above and represents a further development thereof. The efficiency of the plant can be further increased by a further removal of the de-superheated heat transfer medium at an appropriate temperature level and an appropriately adapted refeeding thereof into the main current, as shown in FIG. 8. More precisely, the heat transfer medium is removed in the resuperheating stage 15 after the steam generation stage 12 for a first superheating of the steam in the resuperheating device 31, and fed back into the main current after the preheating stage 11 after having been de-superheated. For the second superheating in the resuperheating device 32, the heat transfer medium is removed before the steam generation stage 12 and fed back into the main current after the steam generation stage 12 after having been de-superheated (first bypass B1). The superheating to the desired final temperature (third superheating) is then carried out in the resuperheating device 33 using hot heat transfer medium, which is then fed back into the main current after the steam generation stage 12 after having been de-superheated (second bypass B2).

Due to this cascading of resuperheating devices 31, 32, 33, the efficiency of the plant can be further increased, but the structural complexity and therefore the investment costs may also increase. This cascading can also be embodied according to the three basic connection variants represented above from the first to third exemplary embodiments, i.e. by direct bypass conduction around the steam superheating stage 13 and/or the steam generation stage 12. Likewise, a further increase in the number of removals and appropriate refeeds is also possible.

Further alternative connection possibilities in a solar thermal power plant using indirect evaporation according to the invention are created by the fact that the steam temperature in the resuperheating stage 15 is no longer superheated to the temperature level of live steam, but rather to a lower temperature. For this, the heat transfer medium may be removed from the main current after the steam superheating stage 13 and the bypass B1 (see FIG. 9) around the steam superheating stage (or superheating bypass) and used in the resuperheating device 32 to resuperheat the steam. After having been de-superheated, the heat transfer medium can be fed back into the main current at the right point according to the temperature level.

Figure 9:
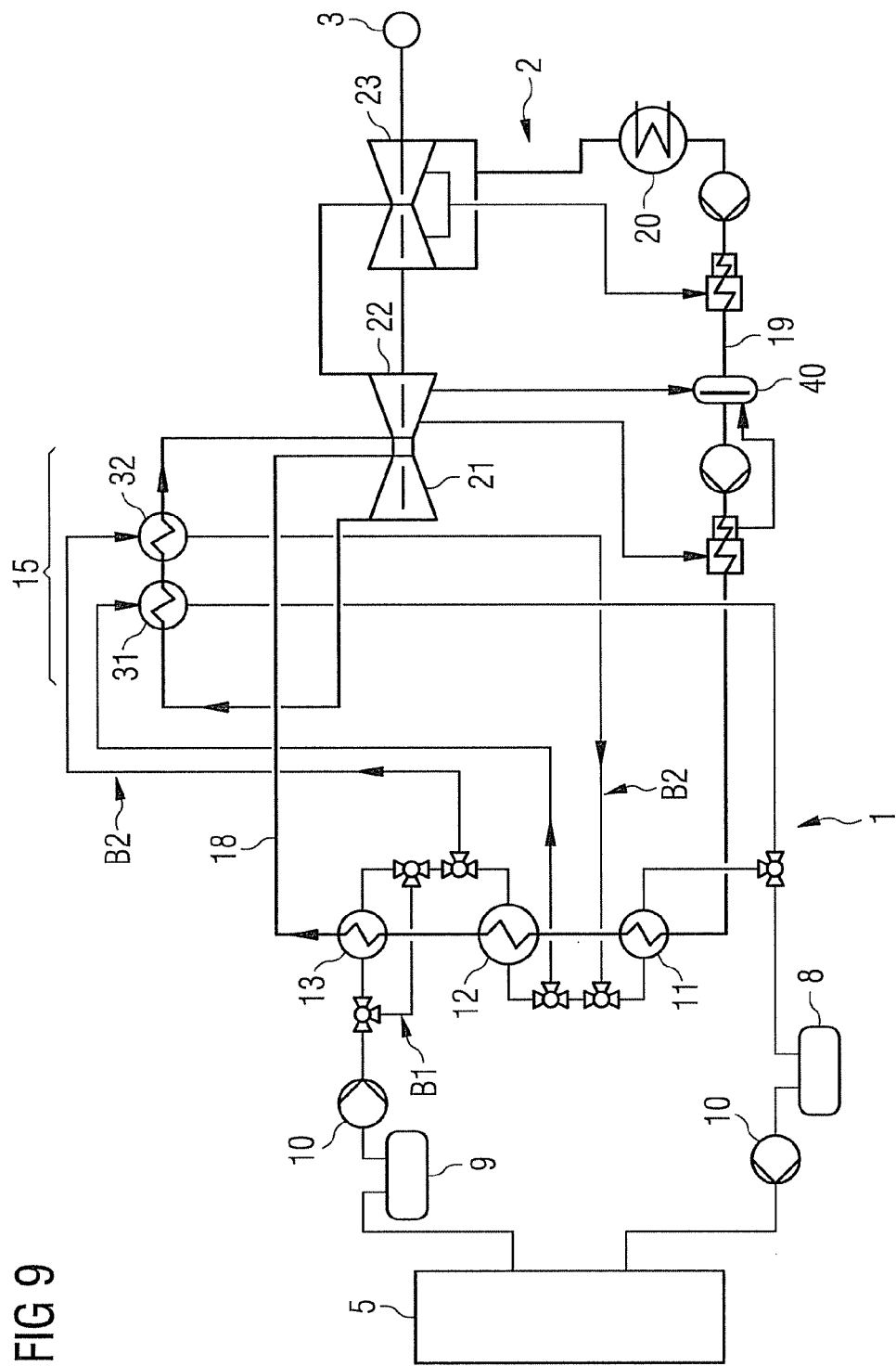
FIG. 9 shows a schematic block diagram of a further alternative exemplary embodiment of a solar thermal power plant using indirect evaporation according to the invention, comprising a dual removal of the heat transfer medium and a resuperheat to a lower steam temperature than the live steam temperature.

A preferred exemplary embodiment of such a connection variant in the resuperheating stage 15 is shown in FIG. 9. In this variant represented in FIG. 9, a partial current of the heat transfer medium is removed after the steam generation stage 12 for a first superheating in the resuperheating device 31 (i.e. in the first heat exchanger system of the resuperheating stage). Moreover, a partial current of the heat transfer medium is removed after the steam superheating stage 13 using the superheating bypass B1, which is used for superheating to the desired steam temperature in a second resuperheating device 32 (i.e. a second heat exchanger system of the resuperheating stage 15). Both de-superheated currents are then fed back into the main current according to their temperature level, and, in accordance with the exemplary variant depicted in FIG. 9, after the preheating stage 11 or the steam generation stage 12. Here, the second resuperheating device is located in a second bypass conduction path (bypass B2).

FIGS. 10 to 15 show further alternative connection variants, all based on dual resuperheating. These are based on the basic connection variants illustrated above and the connection variants for simple resuperheating and are further developments and improvements to conventional dual resuperheating. The variants represented below can be combined with the three basic connections from the first to third exemplary embodiments as well as with all the connections for simple resuperheating illustrated above. As examples, some preferred connection variants below may be consulted to clarify the concept according to the invention, without restricting the invention to the examples specified explicitly herein.

Figure 10:
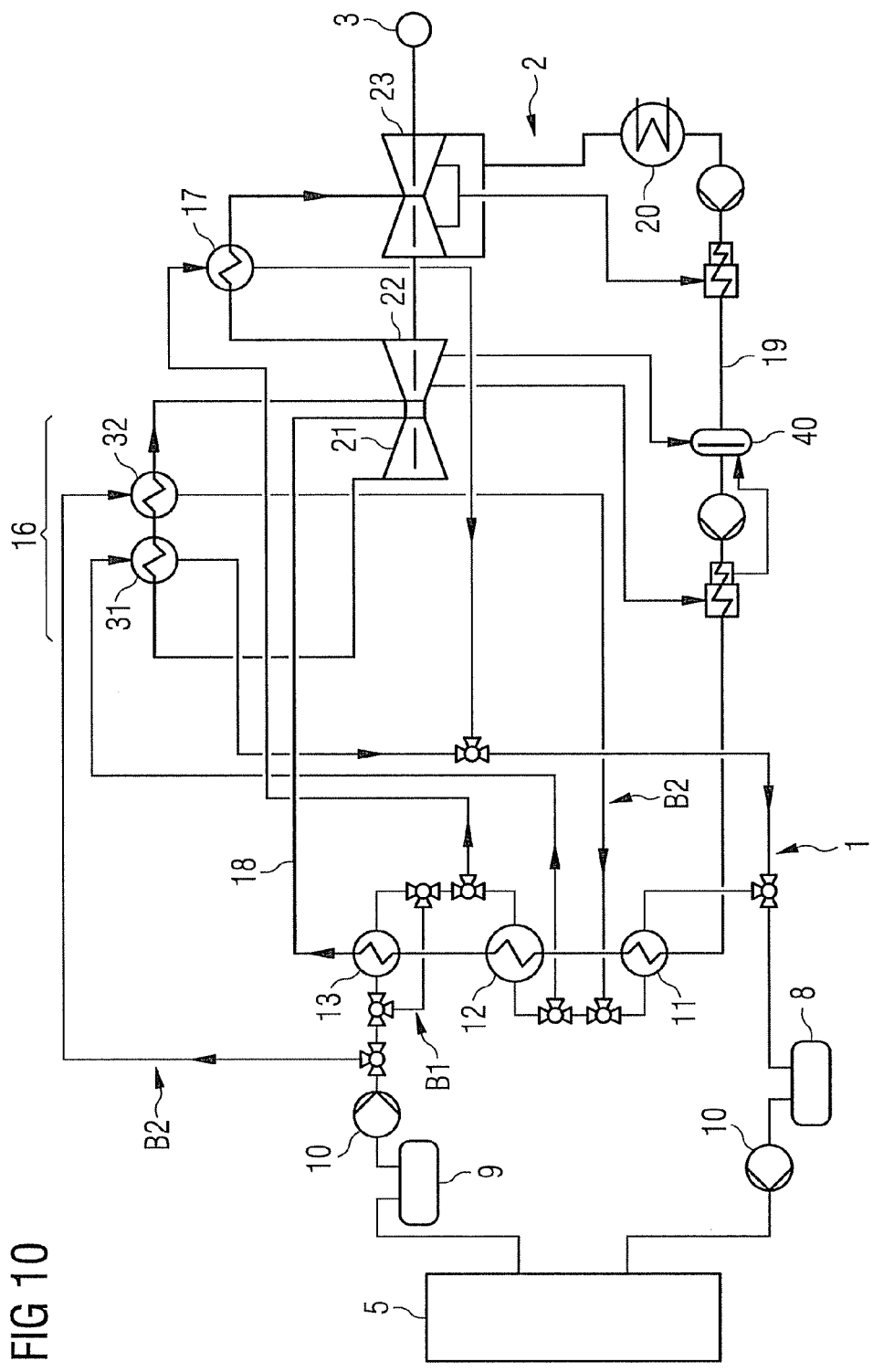
FIG. 10 shows a schematic block diagram of a further alternative exemplary embodiment of a solar thermal power plant using indirect evaporation according to the invention, comprising a second resuperheat by removing the heat transfer medium after the bypass around the steam superheating stage and by feeding it back after the steam generation stage.

FIG. 10 shows an exemplary embodiment with dual resuperheating to a lower temperature level at the second resuperheating stage 17 than the live steam temperature. This means that the second resuperheat occurs to a temperature level lower than the live steam temperature. In this exemplary embodiment, a partial current of the heat transfer medium is removed from the main current after the steam superheating stage 13 and after the first bypass B1 around the steam superheating stage 13, conducted to the second resuperheating stage 17 located after the mid-pressure turbine 22, and fed back into the main current as appropriate to the temperature level. Due to removal after the steam superheating stage 13, the steam can no longer be superheated in the second resuperheating stage 17, to the temperature of live steam, but only to a lower temperature level.

The connection of the first resuperheating stage 16 can be carried out analogously to the preceding exemplary embodiments, for example using a second bypass B2. Moreover, the exemplary connection variant shown in FIG. 10 may be embodied in combination with the three basic variations from the first to third exemplary embodiments, as well as with the various variants for simple resuperheating.

Figure 11:
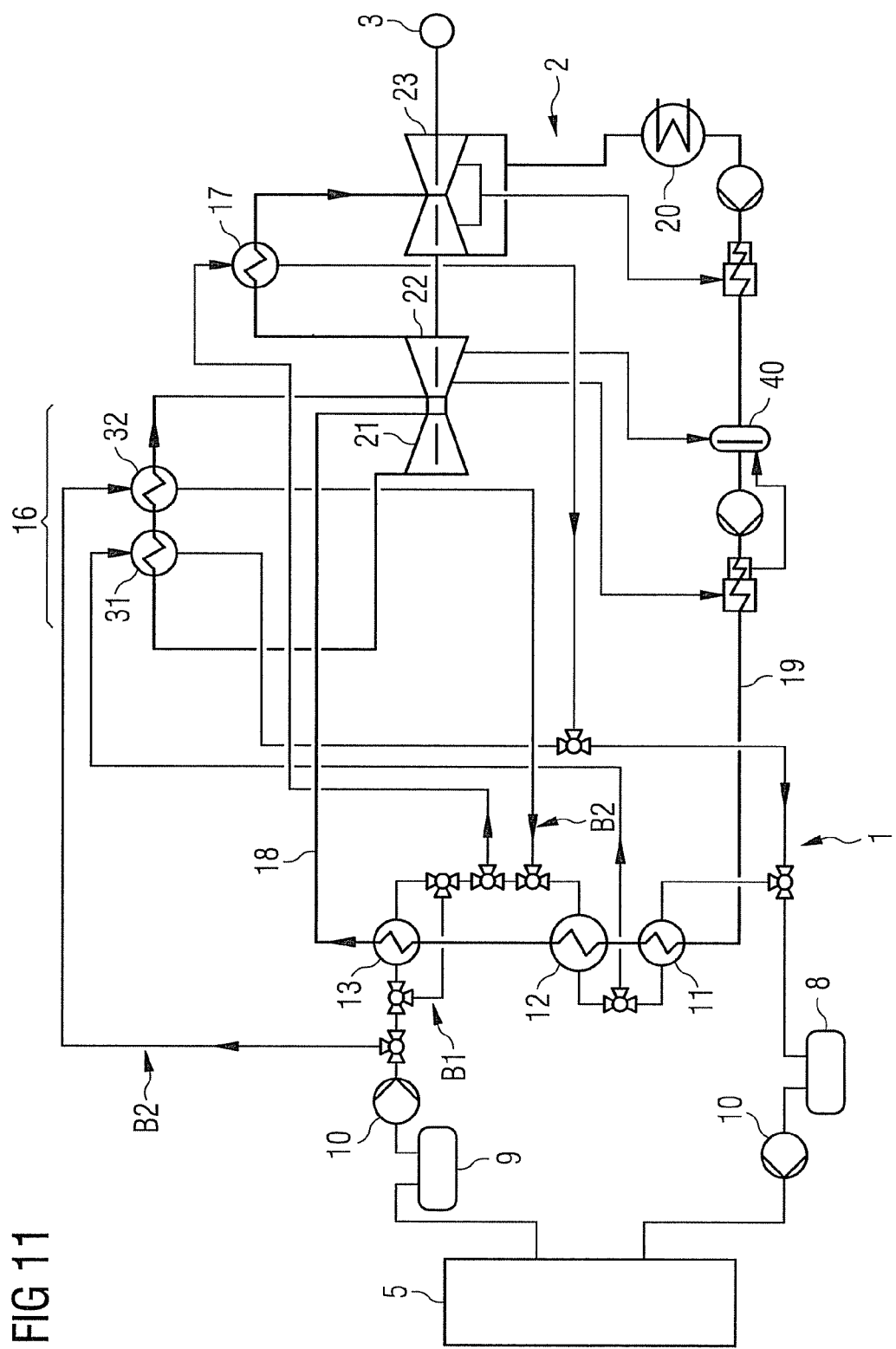
FIG. 11 shows a schematic block diagram of a further alternative exemplary embodiment of a solar thermal power plant using indirect evaporation according to the invention, comprising a first resuperheat in a bypass around the steam superheating stage and a second resuperheat by removing the heat transfer medium after the bypass around the steam superheating stage and by feeding it back before the preheating stage.

A further exemplary embodiment is shown in FIG. 11. In contrast to FIG. 10, where the heat transfer medium is fed back into the main current after the steam generation stage 12 after the second resuperheating device 32 in the first resuperheating stage 16 (i.e. wherein the resuperheating device 32 is located in the bypass around the steam superheating stage 13 and the steam generation stage 12), the heat transfer medium in FIG. 11 is fed back into the main current before the steam generation stage 12 (bypass B). Therefore, in the exemplary embodiment shown in FIG. 11, the resuperheating device 32 of the first resuperheating stage 16 is located in a bypass B2 around the steam superheating stage 13.

Figure 12:
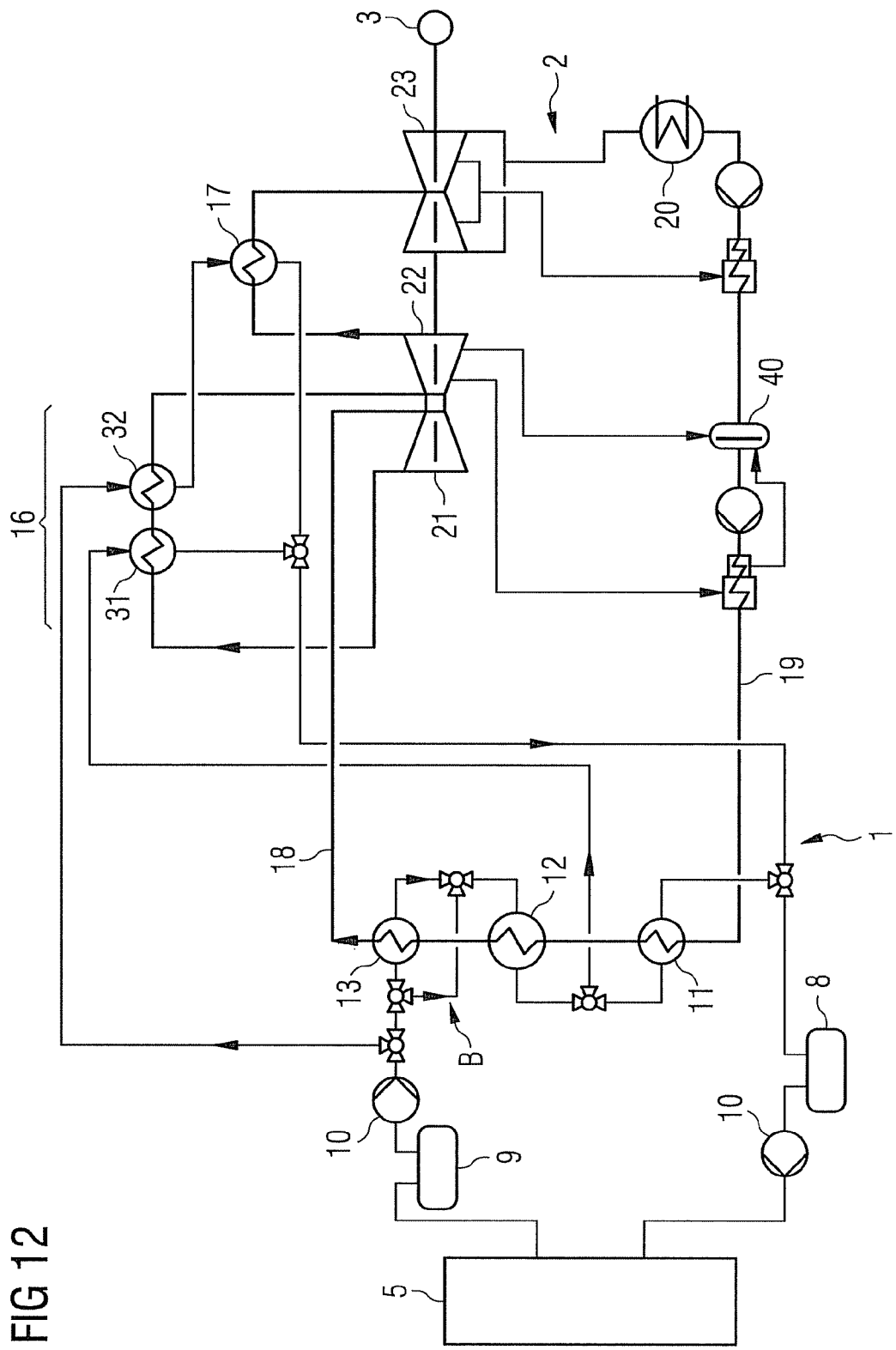
FIG. 12 shows a schematic block diagram of a further alternative exemplary embodiment of a solar thermal power plant using indirect evaporation according to the invention, comprising a bypass around the steam superheating stage and a second resuperheat by using the de-superheated heat transfer medium after the first resuperheat.

FIG. 12 shows a further exemplary embodiment for a connection variant with a dual resuperheating stage and a bypass B around the steam superheating stage 13, wherein the steam is heated to a lower temperature than the live steam temperature during the second resuperheat. This means that the second resuperheat is carried out to a temperature level lower than the live steam temperature. This is achieved by using the heat transfer medium de-superheated after the first resuperheating stage 16 for the second resuperheating stage 17. After the second resuperheating stage 17, it is then fed back into the main current after the preheating stage 11. With this connection, only a steam temperature significantly lower than the live steam temperature can be achieved during the second resuperheat. This variant can also be combined in turn with all basic variants for connecting the steam generation system and for the first resuperheat described above.

Figure 13:
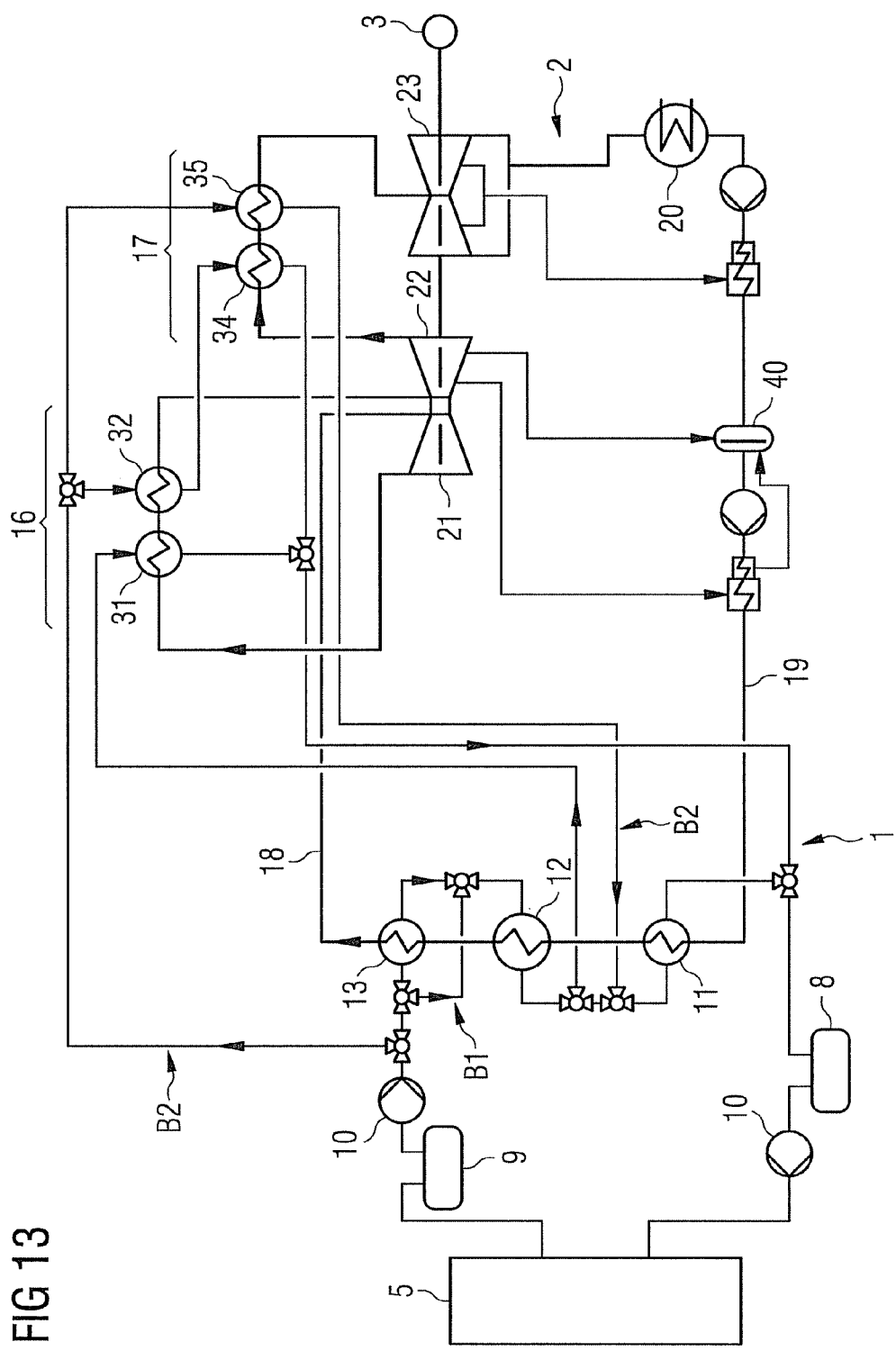
FIG. 13 shows a schematic block diagram of a further alternative exemplary embodiment of a solar thermal power plant using indirect evaporation according to the invention, comprising a bypass around the steam superheating stage and a second resuperheat by using the de-superheated heat transfer medium and hot heat transfer medium after the first resuperheat.

In FIG. 13, a further exemplary embodiment for dual resuperheating is shown. In this exemplary embodiment, the desired final temperature (e.g. the same temperature as live steam) can be achieved by using the hot heat transfer medium for a further superheating in the second resuperheating stage. For this, the variant shown in FIG. 12 is expanded to incorporate a further resuperheating device 35 in the second resuperheating stage 17. This resuperheating device 35 is charged with hot heat transfer medium that has been removed from the main current before the steam superheating stage 13. The de-superheated heat transfer medium is fed back into the main current after the steam generation stage 12 according to its temperature level (see bypass B2). This variant can in turn be coupled with all variants of the steam generation system illustrated above, as well as for the first resuperheat.

In a further alternative embodiment, the same temperature level as that of live steam is achieved at the second resuperheating stage 17 by a dual or manifold removal of the heat transfer medium at various temperature levels and by a dual resuperheat. By using the heat transfer medium at various temperature levels for the second resuperheat, the heat exchange can be designed more effectively. As in the variant shown in FIG. 8 (cascading the heat transfer medium by the threefold or manifold removal of the heat transfer medium at the appropriate temperature level), the heat exchange during the second resuperheat can be appropriately optimized by threefold or manifold removal of the heat transfer medium at the necessary temperature level.

Figure 14:
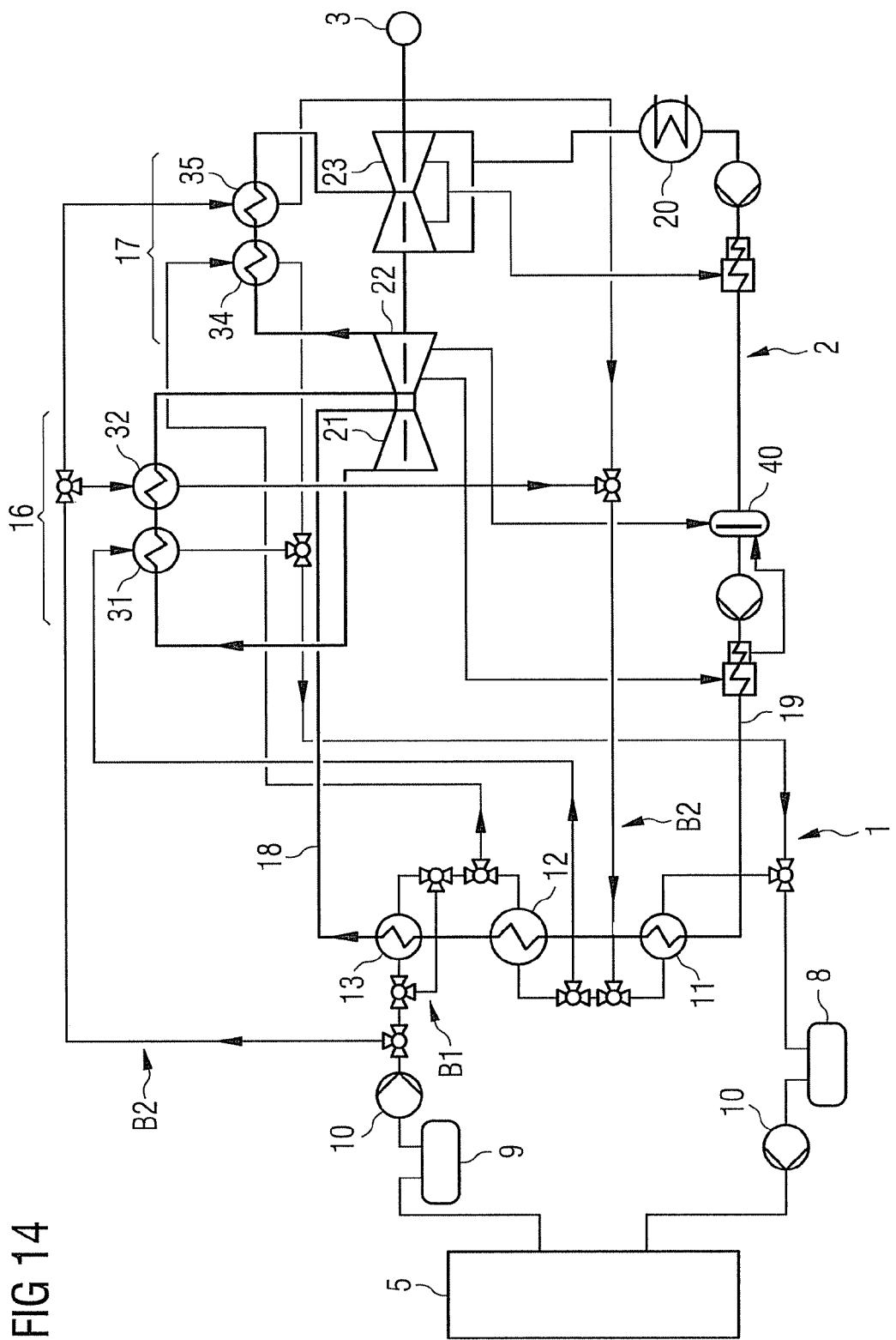
FIG. 14 shows a schematic block diagram of a further alternative exemplary embodiment of a solar thermal power plant using indirect evaporation according to the invention, comprising a bypass around the steam superheating stage and a second resuperheat by dual removal at appropriate temperature levels.

For example, in the exemplary embodiment represented in FIG. 14, the dual removal of the heat transfer medium from the main current for the second resuperheating stage 17 is presented. In dual removal, the heat transfer medium is removed after bypassing the steam superheating stage 13 for a first superheating in the first resuperheating device 34 in the second resuperheating stage 17, for example, and is fed back into the main current according to the temperature level after having been de-superheated. The final superheating to the desired temperature level in the second resuperheating device 35 of the second resuperheating stage 17 is then carried out by removing steam before the steam superheating stage 13. Here, too, the second resuperheating device 35 of the second resuperheating stage 17 is located in a bypass around the steam superheating stage 13 and the steam generation stage 12.

Further removals at an appropriate temperature level (such as threefold removal) and additional heat exchangers therewith are conceivable for the second resuperheat as well as for the first resuperheat. Manifold removal to optimize the second resuperheating can be combined with all basic connection variants of the steam generation system illustrated above and with all connection variants of the first resuperheat.

Figure 15:
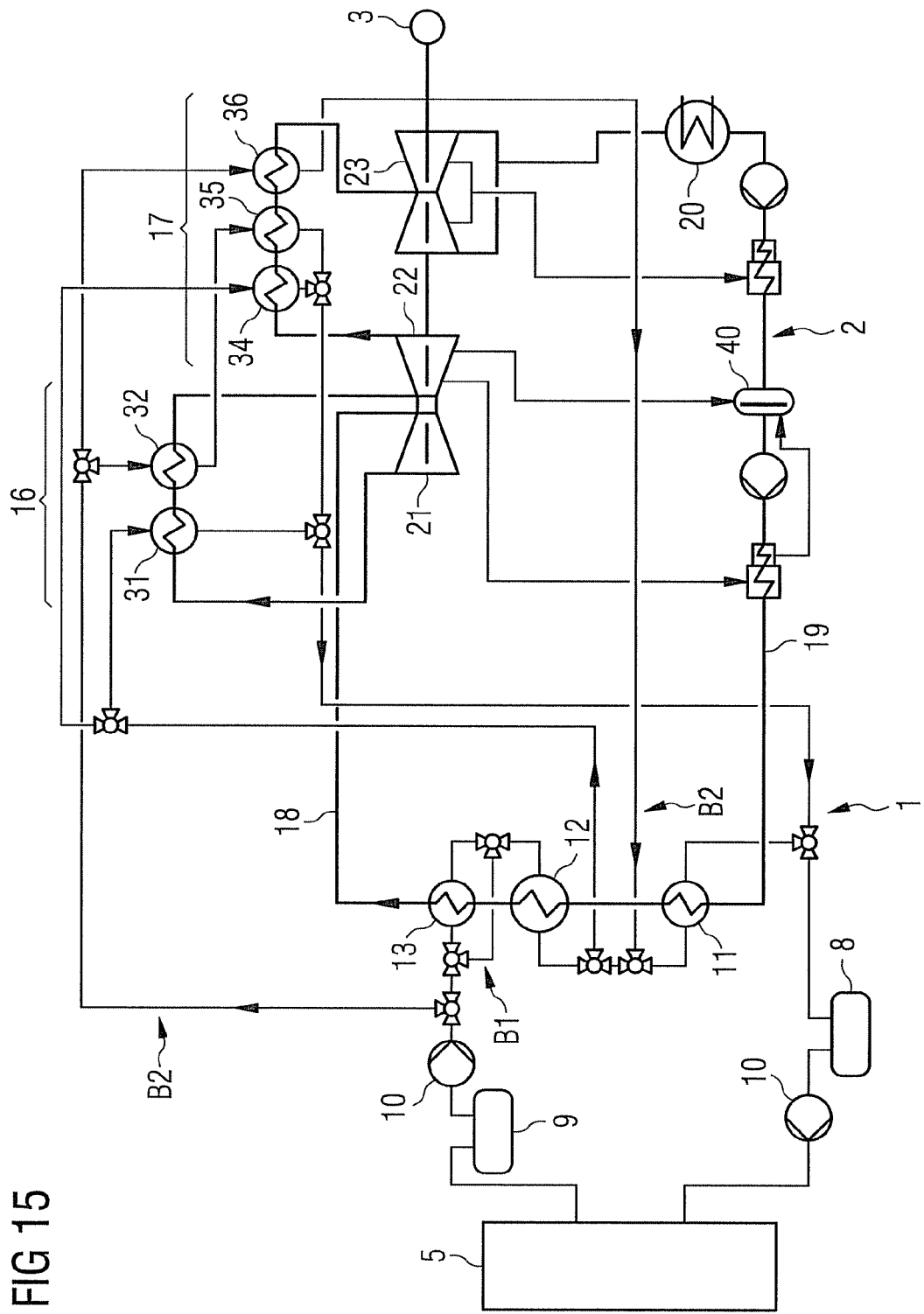
FIG. 15 shows a schematic block diagram of a further alternative exemplary embodiment of a solar thermal power plant using indirect evaporation according to the invention, comprising a bypass around the steam superheating stage and a second resuperheat by dual removal at appropriate temperature levels and by using the de-superheated heat transfer medium after the first resuperheat.

FIG. 15 represents a connection variant for dual resuperheating. A resuperheat to the same temperature level (see bypass B2) as that of live steam takes place through manifold removals of the heat transfer medium at various temperature levels and as a result of using the de-superheated heat transfer medium from the first resuperheating stage 16 at the second resuperheating device 35 of the second resuperheating stage. The heat transfer medium which has been de-superheated after the first resuperheating stage 16 (analogously to the variants shown in FIG. 12 or FIG. 13) can be combined with a manifold removal of the heat transfer medium at various temperature levels, thereby further improving the heat management. It is conceivable for several de-superheated heat transfer currents to be used after the first de-superheating, as well as for there to be several removals from the main current at the appropriate temperature level.

The use of a heat transfer medium de-superheated in the first resuperheat and the use of two partial heat transfer currents with various temperature levels in the resuperheating devices 34, 35, 36 of the second resuperheating stage 17 are represented as a preferred example in FIG. 15. As in all variants, all combinations of steam generation connection and connection of the first resuperheat illustrated above are conceivable.

Finally, it is once again noted that these are merely preferred exemplary embodiments of the connection variants for solar thermal power plants and operating methods described in detail above, which can be modified in various ways by the person skilled in the art without exceeding the scope of the invention, insofar as it is specified by the claims. In particular, the individual variants represented can be combined with each other.

For example, connections variants are conceivable in which individual heat exchanger stages of the secondary circuit may be located in a component of a heat exchanger system of the primary circuit, so that a logical bypass conduction path in the sense of the invention would result. For example, in such a heat exchanger system, the steam superheating stage and a resuperheating stage may be heated in parallel by a hot heat transfer medium, wherein a current of hot heat transfer medium flows around and/or across both in parallel, though the heat transfer medium current is not conducted separately in two separate piping systems. In this case, there is a sort of logical bypass, in that a first part of the heat transfer medium current is used for heat transfer at the steam generation stage and a second part is used for heat transfer at the resuperheating stage. Optionally, heat exchanger stages with lower temperatures in the same component can be located downstream from this current.

Moreover, a temporary thermal storage tank 7 may additionally be incorporated into the primary and/or secondary circuit, temporarily storing thermal energy when operating at surplus output which can be reintroduced into the secondary circuit when operating at insufficient output. A storage tank 8, 9 for the heat transfer medium may also simply be embodied before or after the solar thermal subassembly 5 or they may also be omitted completely.

The invention claimed is:

1. A solar thermal power plant using indirect evaporation, comprising:
a primary circuit having a heat transfer medium conduction system, the primary circuit comprising a solar thermal subassembly for heating the heat transfer medium by means of solar energy;
a steam secondary circuit comprising a preheating stage to preheat feedwater, a steam generation stage downstream from the preheating stage to generate steam, and a steam superheating stage downstream from the steam generation stage to superheat the steam;
a steam turbine system linked to an outlet of the steam superheating stage via a steam conduction system which is fed when operational with the superheated steam;
a condensing system installed downstream from the steam turbine system on the exhaust steam side to condense the steam;
a water conduction system having a feedwater tank located between the condensing system and the preheating stage; and
a generator, which is coupled directly or indirectly to the steam turbine system,
wherein the primary circuit includes a main current including a heat exchanger group having a heat transfer medium conduction system to transfer the heat energy from the heat transfer medium of the primary circuit to the steam superheating stage, the steam generation stage and the preheating stage of the steam secondary circuit, the primary circuit having a bypass conduction path around the steam generation stage, which is fed back into the main current of the heat transfer medium conduction system upstream of the preheating stage.

2. The solar thermal power plant as claimed in claim 1, wherein a further steam superheating stage is located in the bypass conduction path around the steam generation stage.

3. The solar thermal power plant as claimed in claim 1, wherein the heat transfer medium conduction system has a bypass conduction around the preheating stage, where a further steam superheating stage is located.

4. The solar thermal power plant as claimed in claim 1, wherein the heat transfer medium conduction system has a further bypass conduction which circumvents the steam superheating stage and the steam generation stage, where a further steam superheating stage is located.

5. The solar thermal power plant as claimed in claim 1, further comprising a thermal storage tank in the primary circuit and/or the secondary circuit.

6. The solar thermal power plant as claimed in claim 1, wherein a storage tank for the heat transfer medium is located in the primary circuit upstream or downstream from the solar thermal subassembly.

7. The solar thermal power plant as claimed in claim 1, wherein the solar thermal subassembly comprises an array of solar collectors.

8. A method for operating a solar thermal power plant using indirect evaporation, comprising:
heating a heat transfer medium in a primary circuit by means of a solar thermal subassembly using solar energy, and the heated heat transfer medium is conducted into a heat exchanger group to transfer heat energy from the heat transfer medium to a steam secondary circuit, before it is fed back into the solar thermal subassembly after cooling;
preheating, in the steam secondary circuit, feedwater from a feedwater tank in the heat exchanger group in a preheating stage, generating steam in a steam generation stage downstream from the preheating stage and superheating the steam in a steam superheating stage downstream from the steam generation stage, before feeding the superheated steam into a steam turbine system via a steam conduction system, which is coupled directly or indirectly to a generator, condensing the steam discharged from the steam turbine system into water in a condensing system and feeding the water back to the feedwater tank, wherein a partial current of the heat transfer medium of the primary circuit is conducted around the steam generation stage of the steam secondary circuit via a bypass conduction path and is fed back into the primary circuit upstream of the preheating stage.

9. The method for operating a solar thermal power plant as claimed in claim 8, wherein the partial current of the heat transfer medium is conducted around the steam generation stage through a further steam superheating stage in the bypass conduction path.

10. The method for operating a solar thermal power plant as claimed in claim 8 further comprising a partial current of the heat transfer medium conducted around the preheating stage in a bypass conduction, where an additional steam superheating stage is located.

11. The method for operating a solar thermal power plant as claimed in claim 8, wherein the partial current of the heat transfer medium is additionally conducted around the steam superheating stage and the steam generation stage via a bypass conduction path, where an additional steam superheating stage is located, and is fed back into the primary circuit upstream of the preheating stage.

12. The method for operating a solar thermal power plant as claimed in claim 10, wherein the additional steam superheating stage is used in a first or second resuperheating stage to resuperheat the steam discharged from a steam turbine of the steam turbine system, before it is conducted into a further steam turbine.

13. A solar thermal power plant using indirect evaporation, comprising:

a primary circuit having a heat transfer medium conduction system, the primary circuit comprising a solar thermal subassembly for heating the heat transfer medium by means of solar energy;

a steam secondary circuit comprising a preheating stage to preheat feedwater, a steam generation stage downstream from the preheating stage to generate steam, and a steam superheating stage downstream from the steam generation stage to superheat the steam;

a steam turbine system linked to an outlet of the steam superheating stage via a steam conduction system which is fed when operational with the superheated steam;

a condensing system installed downstream from the steam turbine system on the exhaust steam side to condense the steam;

a water conduction system having a feedwater tank located between the condensing system and the preheating stage; and a generator, which is coupled directly or indirectly to the steam turbine system, wherein the primary circuit includes a heat exchanger group having a heat transfer medium conduction system to transfer the heat energy from the heat transfer medium of the primary circuit to the steam superheating stage, the steam generation stage and the preheating stage of the steam secondary circuit, the primary circuit having a bypass conduction path around the steam superheating stage and the steam generation stage, which is fed back into the primary circuit of the heat transfer medium conduction system upstream of the preheating stage.

* * * * *